(12) United States Patent
Watson

(10) Patent No.: US 8,172,287 B1
(45) Date of Patent: May 8, 2012

(54) REPLACEMENT TINE FOR A STALL CLEANING TOOL

(76) Inventor: James Thomas Watson, Plant City, FL (US)

( * ) Notice: Subject to any disclaimer, the term of this patent is extended or adjusted under 35 U.S.C. 154(b) by 0 days.

(21) Appl. No.: 12/939,972

(22) Filed: Nov. 4, 2010

(51) Int. Cl.
A01D 9/00 (2006.01)

(52) U.S. Cl. .................... 294/55.5; 56/400.21

(58) Field of Classification Search ............... 294/55.5; 56/400.01–400.21; 403/109.8, 329
See application file for complete search history.

(56) References Cited

U.S. PATENT DOCUMENTS

| | | | |
|---|---|---|---|
| 2,256,255 A * | 9/1941 | Bangert | 56/249 |
| 2,587,424 A | 2/1952 | Zeman | |
| 2,721,439 A * | 10/1955 | Chrunka | 56/400.17 |
| 2,895,559 A | 7/1959 | Toland | |
| 3,096,609 A * | 7/1963 | Garrett et al. | 56/400 |
| 3,157,019 A * | 11/1964 | Brackbill | 56/400 |
| 4,376,367 A | 3/1983 | Rocquin | |
| D312,030 S | 11/1990 | Brignull | |
| 5,027,907 A | 7/1991 | Delyea | |
| 5,716,161 A * | 2/1998 | Moore et al. | 403/326 |
| D403,133 S | 12/1998 | Bowell et al. | |
| D406,413 S | 3/1999 | Russo | |
| 6,131,381 A | 10/2000 | Milbury | |
| D437,462 S | 2/2001 | Whall et al. | |
| D463,075 S | 9/2002 | Padgett | |
| 6,474,056 B1 | 11/2002 | Hsu | |
| 2009/0229236 A1 * | 9/2009 | Schumacher et al. | 56/400.21 |
| 2010/0299892 A1 * | 12/2010 | Ardern | 24/481 |

* cited by examiner

Primary Examiner — Saul Rodriguez
Assistant Examiner — Gabriela Puig
(74) Attorney, Agent, or Firm — Lonnie R. Drayer

(57) ABSTRACT

A device for repairing a stall cleaning tool that has a broken tine is a tine having a first clamping member integral therewith located at an end of the tine. The first clamping member has a clamping surface with at least one channel therein for receiving at least one structural member of the stall cleaning tool. A second clamping member has a clamping surface with at least one channel therein for receiving at least one structural member of the stall cleaning tool. The first and second clamping members are secured to one another with the clamping surfaces of the clamping members adjacent to one another and the channels in the clamping surfaces aligned with one another.

20 Claims, 4 Drawing Sheets

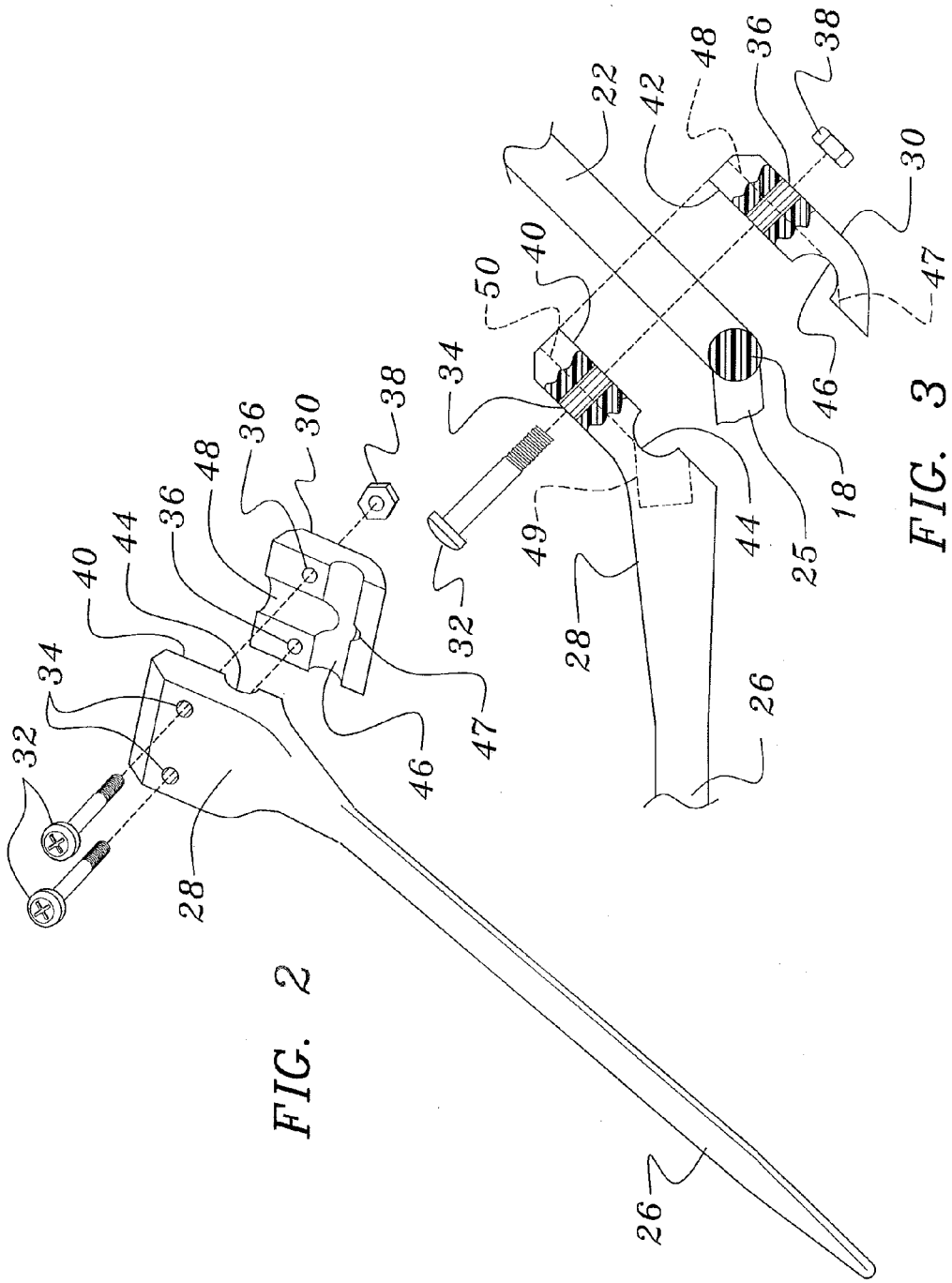

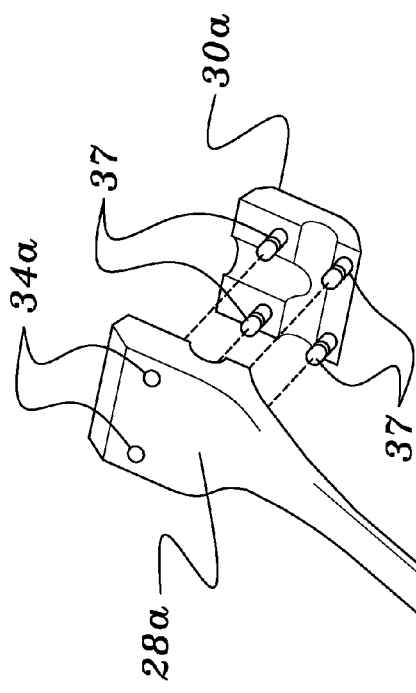
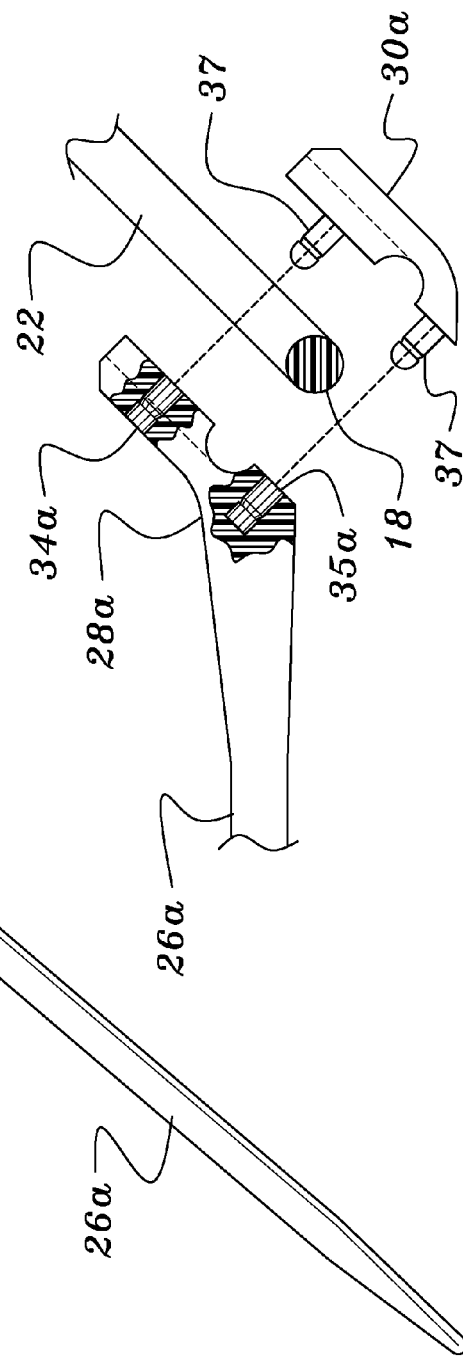
FIG. 4
FIG. 5

REPLACEMENT TINE FOR A STALL CLEANING TOOL

FIELD OF INVENTION

The present invention relates to a device for repairing a stall cleaning tool that has a broken tine.

BACKGROUND OF THE INVENTION

An essential stall cleaning tool for a person who cares for animals that are kept in stalls, such as horses, cows, sheep, goats, and so forth, is a fork with tines. The stall cleaning fork may be in many forms with or without upright sides for keeping the material being cleaned from the stall floor from falling off of the stall cleaning fork. Stall cleaning forks, also called manure forks, and mucking rakes are commonly made of a plastic rake or fork attached to a handle. Examples of such forks and rakes are taught in US D 312,030, US 403,133, US 406,413, US D 437,462, and US D 463,075. While these forks and rakes are well suited to the task of cleaning stalls, it is not uncommon for a plastic tine to be broken in use resulting in a wider spacing between the adjoining unbroken tines than between adjoining unbroken tines. Even one broken tine can render the fork or rake unusable for its intended purpose because the manure being cleaned from a stall will simply fall through the wide space left by the broken tine.

DISCUSSION OF THE PRIOR ART

U.S. Pat. No. 2,895,559 teaches a replaceable earth penetrating point for a cultivator that is attached to a shank using a threaded fastener. In this assembly it is a design feature that the replaceable point is a wear member that will need to be replaced occasionally due to wear or damage.

U.S. Pat. No. 2,587,424 teaches a lawn rake having a structure wherein a slide or keeper may be manipulated to release a damaged tine and allow a replacement tine to take its place, and thereafter the slide or keeper is manipulated back into it's' tine retaining configuration. This lawn rake is designed for use in a manner similar to that of a broom, whereas a fork or stall rake is intended for use in a manner more similar to a shovel.

U.S. Pat. No. 3,157,019 teaches a reusable resilient mounting for a rake tine of a hay rake. The tine is made of steel and is fixed to a rake bar with a rubber mounting. The object of the disclosed device is to facilitate reusing the rubber mount when the rake tine, which is a wear item, is replaced as a periodic maintenance procedure.

U.S. Pat. No. 4,376,367 teaches a flexible garden rake with a cross arm to which individual tines are attached by a retainer strip that is slip fitted within a channel. End portions of the tines are complementary to an interior surface of the channel. The tines may be removed and replaced.

U.S. Pat. No. 5,027,907 teaches replacement tips for spring harrows. The tines are a wear item and the design of the device has the tines attached in a removable and replaceable manner using a sleeve that receives a replacement tine and attaches the replacement tine to a base of an original tine.

U.S. Pat. No. 6,131,381 teaches a lawn rake with replaceable metal tines wherein a tubular crossarm has apertures that receive tines that have a looped bend that snaps around the crossarm.

U.S. Pat. No. 6,474,056 teaches a lawn rake that can have replacement tines that are bent and engaged into a rake member for example by pegs that are solidly secured to the rake member.

SUMMARY OF INVENTION

There is provided in accordance with the present invention a device for repairing a stall cleaning tool that has a broken tine. The device is a tine having a first clamping member integral therewith located at an end of the tine, the first clamping member having a clamping surface with at least one channel therein for receiving at least one structural member of the stall cleaning tool. A second clamping member has a clamping surface with at least one channel therein for receiving at least one structural member of the stall cleaning tool. A means for securing secures the first and second clamping members to one another with the clamping surfaces of the clamping members adjacent to one another and the channels in the clamping surfaces aligned with one another.

BRIEF DESCRIPTION OF THE DRAWINGS

For a fuller understanding of the invention, reference should be made to the following detailed description, taken in connection with the accompanying drawings.

FIG. 2 is a perspective view of the components of a device for repairing a stall cleaning tool according to a first embodiment of the invention.

FIG. 3 is a side view, partially in section, of the components of a device for repairing a stall cleaning tool according to the first embodiment of the invention.

FIG. 4 is a perspective view of the components of a device for repairing a stall cleaning tool according to a second embodiment of the invention.

FIG. 5 is a side view, partially in section, of the components of a device for repairing a stall cleaning tool according to the second embodiment of the invention.

DETAILED DESCRIPTION OF THE INVENTION

Figure 1:
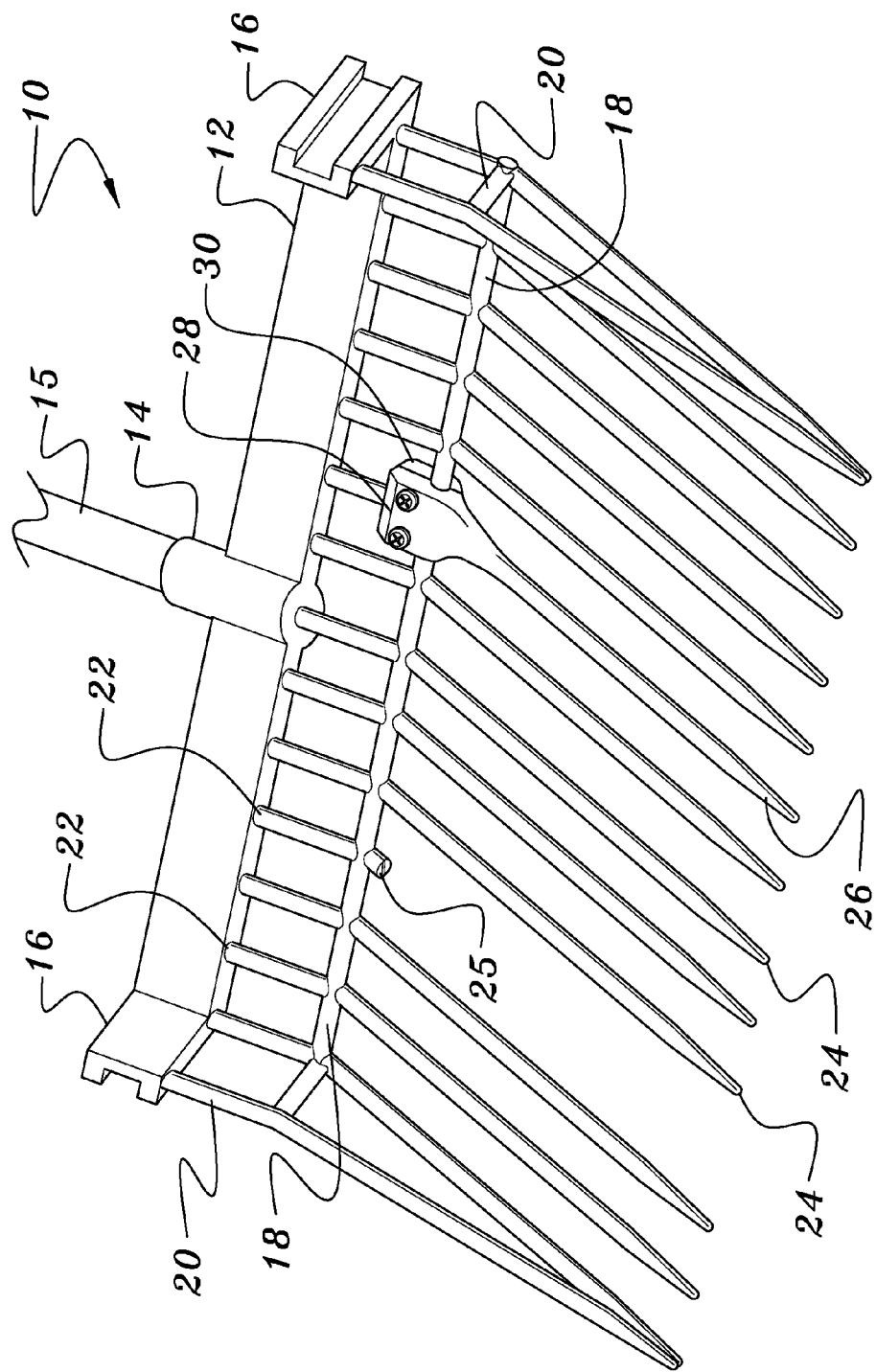
FIG. 1 is a perspective view of a device for cleaning a stall that has a broken tine and a tine that has been replaced by a device according to the present invention.

FIG. 1 shows a generic stall cleaning tool 10, commonly referred to as a stall cleaning fork, manure forks or mucking rake. Metal pitch forks have traditionally been used as stall cleaning tools, but it is now very common to use plastic stall cleaning tools of the type shown in FIG. 1, and tines 24 of a plastic stall cleaning tool are subject to breakage. As used herein and in the claims the term "plastic" is understood to refer to any of a group of synthetic or natural organic materials that may be shaped when soft and then hardened including many types of resins, resinoids, polymers, cellulose derivates, casein materials and proteins used in place of other materials such as metals.

The stall cleaning tool 10 shown has a main crossbar 12 that includes a socket 14 for receiving a handle 15. Sidebars 16 extend from each end of the main crossbar 12. A supplemental crossbar 18 is attached to the main crossbar 12 by a plurality of connecting bars 22. As shown the supplemental crossbar 18 is parallel to the main crossbar 12, and the connecting bars 22 are perpendicular to both the main crossbar and the supplemental crossbar. Supplemental sidebars 20 are parallel to the sidebars 16. A plurality of tines 24 extend from the supplemental crossbar 18. As shown the tines 24 are each aligned with one of the connecting bars 22. The tines 24 are arranged parallel to one another, and are shown spaced equidistant from the next adjacent tines. While the tines shown in this generic stall cleaning tool are round in cross section, it is understood that the tines of a stall cleaning tool may have any desired cross section and can even have reinforcing ribs protruding from the tines. The exact configuration of a stall cleaning tool that may be repaired with the present invention may vary depending upon the design selected by a manufacturer of a stall cleaning tool, including for example forks and rakes are taught in US D 312,030, US 403,133, US 406,413, US D 437,462, and US D 463,075, all of which are incorporated herein in their entireties for the purpose of disclosing stall cleaning tools that my be repaired using the present invention. It is further understood that while stall cleaning tools that may be repaired using the present invention are commonly made of plastic, that stall cleaning tools made of other materials, or a combination of materials, may also be repaired using the present invention.

The stall cleaning tool 10 of FIG. 1 has a stub 25 of a broken tine resulting in a large space between the tines that are next adjacent to the broken tine. Even one broken tine may significantly reduce the effectiveness of the stall cleaning tool for cleaning a stall. It is understood that when tines are broken the length of the stubs will vary.

Before installing a device according to the present invention it is recommended that a broken tine be cut to extend a predetermined length from the supplemental crossbar 18. The predetermined length may be from about one-half inch down to even with the supplemental crossbar, depending upon the embodiment of the repair device and the structure of the stall cleaning tool.

In FIG. 1 a device for repairing a stall cleaning tool that has a broken tine has been fixed to the stall cleaning tool at the location of a second broken tine. With reference to FIGS. 1-3, a first embodiment of a device for repairing a stall cleaning tool includes a replacement tine 26 having a first clamping member 28 integral therewith located at an end of the tine. The first clamping member 28 has a clamping surface 40 that is not flat, with a means 44 for receiving at least one structural member of the stall cleaning tool, such as the supplemental crossbar 18. A second clamping member 30 has a clamping surface 42 that is not flat, with at least one means 46, 48 for receiving at least one structural member of the stall cleaning tool. The first embodiment will accommodate situations where a broken tine leaves no stub, up to a situation where a broken tine leaves a stub up to about one-half inch long. In this first embodiment the clamping surfaces are provided with channels 44, 46, 48 therein for receiving a crossbar 18 of the stall cleaning tool and a structural member 22 of the stall cleaning tool that intersects and is perpendicular to the crossbar. As used herein and in the claims the term "channel" is understood to refer to an indentation or groove in a surface, and the term "well" is understood to refer to a hole or shaft extending from a surface of an object into the object. The clamping surfaces 40, 42 of the first and second clamping members 28, 30 therefore have channels that are aligned with one another when the clamping members are assembled around appropriate structural members of the stall cleaning tool.

As best shown in FIG. 3 the first clamping member 28 has a well 49 for receiving a stub of the broken tine 25. A notch 47 in the second clamping member 30 receives the broken tine 25 to facilitate the proper mating of the first and second clamping members. This first embodiment may be employed even if there is no stub remaining from a broken tine. Referring again to FIG. 1 it can be seen that the width of the clamping members is conveniently equal to about the distance between adjacent tines, with the clamping members when installed on a stall cleaning tool extending not more than half way between adjacent tines. This allows for the replacement of two broken tines that were adjacent to one another.

To repair a stall cleaning member having a broken tine, first the length of the broken tine is, if necessary shortened by cutting with a knife, saw or chisel, to a predetermined length. The first and second clamping members are positioned to receive the appropriate structural members of the stall cleaning tool in the means provided by the first and second clamping members, and then the first and second clamping members are secured to one another by an appropriate means for securing. In the first embodiment the means for securing the first and second clamping members 28, 30 to one another with the clamping surfaces 40, 42 of the clamping members adjacent to one another and the means for receiving at least one structural member of the stall cleaning tool aligned with one another. In this first embodiment the means for securing the first and second clamping members to one another comprises at least one threaded fastener 32 that extends into passages 34, 36 in the first and second clamping members. The threads of the fastener may mate with threads provided in walls of at least one of the passageways, or with a nut 38 that may be molded into one of the clamping members, or simply attached to the threaded fastener to secure the clamping members to one another. Preferably at least two threaded fasteners are used as shown in FIGS. 1-3.

A second embodiment of a device for repairing a stall cleaning tool that has a broken tine is shown in FIGS. 4 and 5 and includes a replacement tine 26a having a first clamping member 28a integral therewith located at an end of the tine. The first clamping member 28a has a clamping surface that is not flat, with a means for receiving at least one structural member 22 of the stall cleaning tool. A second clamping member 30a has a clamping surface that is not flat, with at least one means for receiving at least one structural member of the stall cleaning tool. This second embodiment is substantially like the first embodiment described above, but this embodiment is an example of one in which the stub of a broken tine is completely removed do that only a crossbar of the stall cleaning tool and a structural member of the stall cleaning tool that intersects and is perpendicular to the crossbar are received in channels in the clamping surfaces of the first and second clamping members. In this second embodiment the means for securing the first and second clamping members 28a, 30a to one another comprises at least one securing member 37 protruding from one of the clamping members 30a that is inserted into an opening 34a, 35a in the other clamping member 28a fixing the clamping members to one another. That is to say in this embodiment the two clamping members are snapped together with a fit that has an interference that is sufficient to hold the clamping members securely in place around at least one structural member of the stall cleaning tool.

Figure 6:
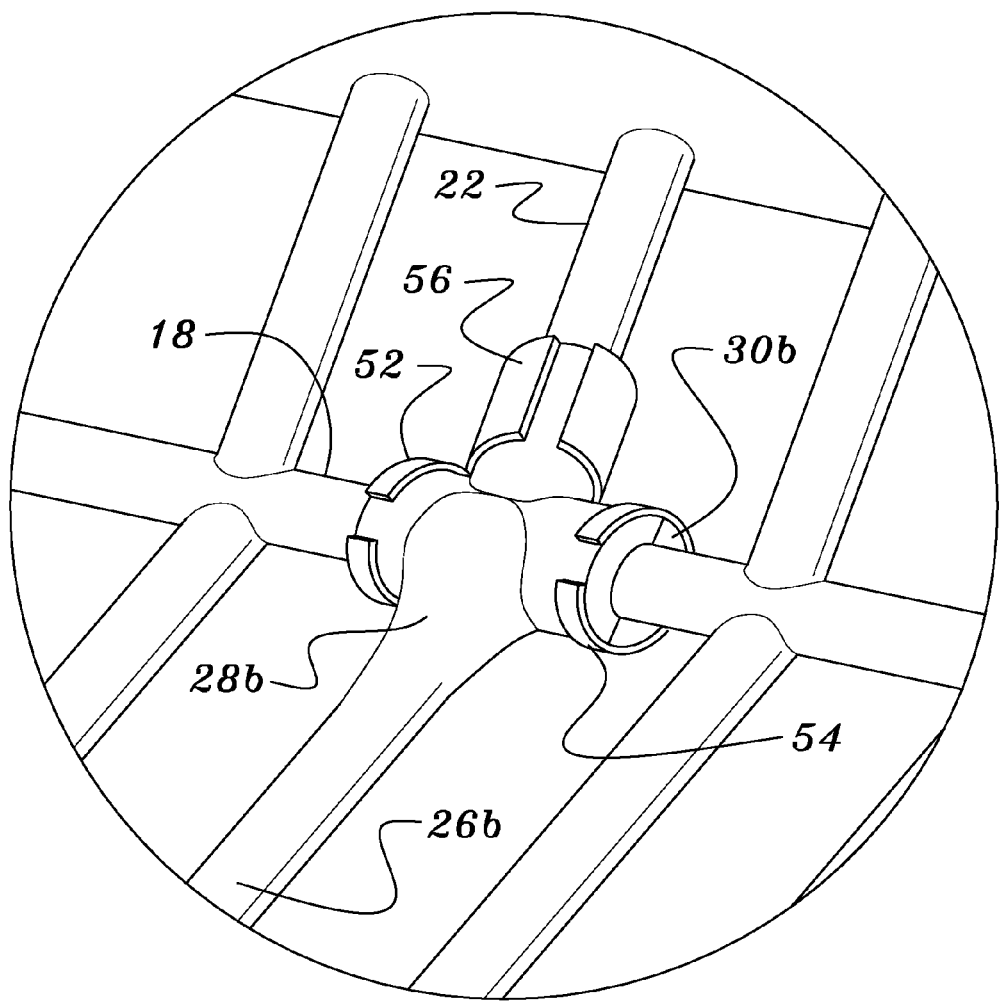
FIG. 6 is an enlarged perspective view of a device for repairing a stall cleaning tool according to a third second embodiment of the invention secured to a stall cleaning tool.

A third embodiment of a device for repairing a stall cleaning tool that has a broken tine is shown in FIG. 6 and includes a replacement tine 26b having a first clamping member 28b integral therewith located at an end of the tine. A second clamping member 30b having a clamping surface is also provided. This third embodiment is substantially like the first and second embodiment described above with respect to the clamping surfaces of the clamping members not being flat, and each having a means for receiving at least one structural member 18, 22 of the stall cleaning tool. In this embodiment the means for securing the first and second clamping members 28b, 30b to one another comprises at least one clamp 52, 54, 56 that extends at least partially around the two clamping members when the clamping members are adjacent to one another to clamp the clamping members to one another. The clamps can be of any appropriate configuration, including snap rings.

It is understood that if desired the means for securing the first and second clamping members to one another may be an adhesive joining the clamping surfaces of the clamping members to one another. An adhesive may be used alone or in combination with one of the means for securing disclosed in the first, second or third embodiments. It is further understood that each of the various means for securing the clamping members to one another may be used with any of the configurations for the clamping members disclosed herein.

It is to be understood that the dimensions and geometric configurations of a device for repairing a stall cleaning tool that has a broken tine according to the present invention must be customized to fit the stall cleaning tool that is to be repaired, since stall cleaning tools marketed by different manufacturers have different dimensions and geometric configurations. For example the lengths and shapes of tines, the distance between adjacent tines, and dimensions of structural members of the stall cleaning tools must be accommodated.

It is also to be understood that the following claims are intended to cover all of the generic and specific features of the invention herein described, and all statements of the scope of the invention which, as a matter of language, might be said to fall there between.

What is claimed is:

1. A device for repairing a stall cleaning tool that has a broken tine, the device comprising:
    a tine having a first clamping member integral therewith located at an end of the tine, the first clamping member having a clamping surface that is not flat and is provided with a means for receiving at least one structural member of the stall cleaning tool;
    a second clamping member that has a clamping surface that is not flat and is provided with at least one means for receiving at least one structural member of the stall cleaning tool; and
    a means for securing the first and second clamping members to one another with the clamping surfaces of the clamping members adjacent to one another and the means for receiving at least one structural member of the stall cleaning tool aligned with one another, the device including a means for receiving a stub of the broken tine.

2. The device of claim 1 wherein the means for securing the first and second clamping members to one another comprises at least one threaded fastener.

3. The device of claim 2 wherein the means for securing the first and second clamping members to one another further comprises a nut for attachment to the threaded fastener.

4. The device of claim 1 wherein the means for securing the first and second clamping members to one another comprises at least one securing member protruding from one of the clamping members that is inserted into an opening in the other clamping member fixing the clamping members to one another.

5. The device of claim 1 wherein the means for securing the first and second clamping members to one another comprises at least one clamp that extends at least partially around the two clamping members when the clamping members are adjacent to one another to clamp the clamping members to one another.

6. The device of claim 1 wherein the means for securing the first and second clamping members to one another comprises an adhesive.

7. A device for repairing a stall cleaning tool that has a broken tine, the device comprising:
    a tine having a first clamping member integral therewith located at an end of the tine, the first clamping member having a clamping surface with channels therein for receiving a crossbar of the stall cleaning tool and a structural member of the stall cleaning tool that intersects and is perpendicular to the crossbar;
    a second clamping member that has a clamping surface having channels therein for receiving the crossbar of the stall cleaning tool and the structural member of the stall cleaning tool that intersects and is perpendicular to the crossbar; and
    a means for securing the first and second clamping members to one another with the clamping surfaces of the clamping members adjacent to one another and the channels in the clamping surfaces aligned with one another.

8. The device of claim 7 wherein both the first and second clamping members include means for receiving a stub of the broken tine.

9. The device of claim 8 wherein the means for securing the first and second clamping members to one another comprises at least one threaded fastener.

10. The device of claim 8 wherein the means for securing the first and second clamping members to one another comprises at least one securing member protruding from one of the clamping members that is inserted into an opening in the other clamping member fixing the clamping members to one another.

11. The device of claim 7 wherein the means for securing the first and second clamping members to one another comprises at least one threaded fastener.

12. The device of claim 7 wherein the means for securing the first and second clamping members to one another comprises at least member protruding from one of the clamping members that is inserted into an opening in the other clamping member fixing the clamping members to one another.

13. The device of claim 7 wherein the means for securing the first and second clamping members to one another comprises at least one clamp that extends at least partially around the two clamping members when the clamping members are adjacent to one another to clamp the clamping members to one another.

14. The device of claim 7 wherein the means for securing the first and second clamping members to one another comprises an adhesive.

15. A plastic replacement tine for a plastic stall cleaning tool that has a broken tine, the replacement tine comprising:
    a tine having a first clamping member integral therewith located at an end of the tine, the first clamping member having a clamping surface with channels therein for receiving a crossbar of the stall cleaning tool and a structural member of the stall cleaning tool that intersects and is perpendicular to the crossbar;
    a second clamping member that has a clamping surface having channels therein for receiving (a) a crossbar of the stall cleaning tool, and (b) a structural member of the stall cleaning tool that intersects and is perpendicular to the crossbar; and
    a means for securing the first and second clamping members to one another with the clamping surfaces of the clamping members adjacent to one another.

16. The device of claim 15 wherein the means for securing the first and second clamping members to one another comprises at least one threaded fastener.

17. The device of claim 16 wherein the means for securing the first and second clamping members to one another further comprises a nut for attachment to the threaded fastener.

18. The device of claim 15 wherein the means for securing the first and second clamping members to one another comprises at least one securing member protruding from one of the clamping members that is inserted into an opening in the other clamping member fixing the clamping members to one another.

19. The device of claim 15 wherein the means for securing the first and second clamping members to one another comprises at least one clamp that extends at least partially around the two clamping members when the clamping members are adjacent to one another to clamp the clamping members to one another.

20. The device of claim 15 wherein the means for securing the first and second clamping members to one another comprises an adhesive.

* * * * *